(12) United States Patent
Zhou et al.

(10) Patent No.: US 9,740,936 B2
(45) Date of Patent: Aug. 22, 2017

(54) CLUSTER BASED PHOTO NAVIGATION

(71) Applicant: Google Inc., Mountain View, CA (US)

(72) Inventors: Guiheng Zhou, Beijing (CN); Liyong Chen, Beijing (CN); Hui Lou, Menlo Park, CA (US); Junjie Ke, Beijing (CN); Hao Chen, Beijing (CN); Deben Kong, Beijing (CN); David Robert Gallup, Bothell, WA (US)

(73) Assignee: Google Inc., Mountain View, CA (US)

( * ) Notice: Subject to any disclaimer, the term of this patent is extended or adjusted under 35 U.S.C. 154(b) by 51 days.

(21) Appl. No.: 14/779,500

(22) PCT Filed: Mar. 27, 2015

(86) PCT No.: PCT/CN2015/075241
§ 371 (c)(1),
(2) Date: Sep. 23, 2015

(87) PCT Pub. No.: WO2016/154808
PCT Pub. Date: Oct. 6, 2016

(65) Prior Publication Data
US 2016/0283826 A1 Sep. 29, 2016

(51) Int. Cl.
*G06K 9/62* (2006.01)
*G06K 9/00* (2006.01)
(Continued)

(52) U.S. Cl.
CPC ......... *G06K 9/00677* (2013.01); *G06K 9/627* (2013.01); *G06F 3/0485* (2013.01); *G06F 3/04815* (2013.01); *G06K 2009/2045* (2013.01)

(58) Field of Classification Search
CPC ............... G06K 9/00677; G06K 9/627; G06K 2009/2045; G06F 3/04815; G03F 3/0485
See application file for complete search history.

(56) References Cited

U.S. PATENT DOCUMENTS 8,335,384 B2 * 12/2012 Nakate ............. G06F 17/30265
382/225
8,571,331 B2 * 10/2013 Cifarelli ............. G06F 17/3028
382/224
(Continued)

FOREIGN PATENT DOCUMENTS

CN 1773493 A 5/2006
CN 102347016 A 2/2012
(Continued)

OTHER PUBLICATIONS

Garg et al., "Dynamic Mosaics", 8 pages, 2012.
(Continued)

*Primary Examiner* — Samir Ahmed
(74) *Attorney, Agent, or Firm* — Lerner, David, Littenberg, Krumholz & Mentlik, LLP

(57) ABSTRACT

The technology relates to navigating imagery that is organized into clusters based on common patterns exhibited when imagery is captured. For example, a set of captured images which satisfy a predetermined pattern may be determined. The images in the set of set of captured images may be grouped into one or more clusters according to the predetermined pattern. A request to display a first cluster of the one or more clusters may be received and, in response, a first captured image from the requested first cluster may be selected. The selected first captured image may then be displayed.

18 Claims, 10 Drawing Sheets

(51) Int. Cl.
*G06F 3/0481* (2013.01)
*G06F 3/0485* (2013.01)
*G06K 9/20* (2006.01)

(56) References Cited

U.S. PATENT DOCUMENTS

| | | |
|---|---|---|
| 2006/0097988 A1 | 5/2006 | Hong |
| 2006/0120624 A1* | 6/2006 | Jojic ................ G06F 17/30843 382/284 |
| 2006/0193538 A1 | 8/2006 | Vronay et al. |
| 2007/0098266 A1 | 5/2007 | Chiu et al. |
| 2007/0279494 A1* | 12/2007 | Aman .................... G01S 3/7864 348/169 |
| 2008/0118160 A1 | 5/2008 | Fan et al. |
| 2011/0032361 A1* | 2/2011 | Tamir ..................... H04N 7/181 348/157 |
| 2011/0181617 A1* | 7/2011 | Tsuda ..................... G06F 3/0481 345/619 |
| 2012/0154548 A1* | 6/2012 | Zargarpour ............ G03B 35/10 348/48 |
| 2015/0029092 A1* | 1/2015 | Holz ....................... G06F 3/017 345/156 |

FOREIGN PATENT DOCUMENTS

| | | |
|---|---|---|
| CN | 104123339 A | 10/2014 |
| EP | 1990772 A3 | 7/2009 |

OTHER PUBLICATIONS

Ladikos et al., "Spectral Camera Clustering", Computer Vision Workshops (ICCV Workshops), 2009 IEEE 12th International Conference, Sep. 27, 2009-Oct. 4, 2009, 7 pages.
International Search Report and Written Opinion for PCT/CN2015/075241 dated Dec. 31, 2015.

* cited by examiner

CLUSTER BASED PHOTO NAVIGATION

CROSS-REFERENCE TO RELATED APPLICATIONS

The present application is a national phase entry under 35 U.S.C. §371 of International Application No. PCT/CN/2015/075241, filed Mar. 27, 2015, entitled "CLUSTER BASED PHOTO NAVIGATION," the disclosure of which is incorporated herein by reference.

BACKGROUND

Many methods of organizing and navigating images of various scenes captured by multiple users have been used. In some examples, images of the same scenes captured by multiple users may be combined into groups. Such groups may contain various numbers of captured images taken from many angles and distances in relation to the captured scenes. Users may then view the images within a single group without regard to where the images were captured. Thus, the current methods of organizing and navigating images results in an unpredictable display of images which may be unintuitive and jarring to a user.

SUMMARY

Embodiments within the disclosure relate generally to presenting images. One aspect includes a method for organizing and navigating image clusters on a device. A set of captured images may be accessed by one or more processing devices. The one or more processing devices may then detect whether images within the set of captured images satisfy a predetermined pattern; group the images in the set of captured images into one or more clusters according to the detected predetermined pattern; receive a request to display a first cluster of the one or more clusters of captured images; and select, in response to the request, a first captured image from the first cluster to display. The first captured image from the first cluster may be provided for display.

One embodiment provides a system for organizing and navigating image clusters. The system includes one or more computing devices; and memory storing instructions, the instructions executable by the one or more computing devices. The instructions include accessing, by one or more computing devices, a set of captured images; detecting, by the one or more computing devices, whether images within the set of captured images satisfy a predetermined pattern; and grouping, by the one or more computing devices, the images in the set of captured images into one or more clusters according to the detected predetermined pattern; receiving, by the one or more computing devices, a request to display a first cluster of the one or more clusters of captured images; selecting, by the one or more computing devices in response to the request, a first captured image from the first cluster to display; and providing the first captured image from the first cluster for display.

One embodiment provides a system for organizing and navigating image clusters. The system includes one or more computing devices; and memory storing instructions, the instructions executable by the one or more computing devices. The instructions include accessing, by one or more computing devices, a set of captured images; detecting, by the one or more computing devices, whether images within the set of captured images satisfy a predetermined pattern; grouping, by the one or more computing devices, the images in the set of captured images into one or more clusters according to the detected predetermined pattern; receiving, by the one or more computing devices, a request to display a first cluster of the one or more clusters of captured images; selecting, by the one or more computing devices in response to the request, a first captured image from the first cluster to display; providing the first captured image from the first cluster for display; determining, by the one or more computing devices, from the images within the first cluster, a set of neighboring captured images that are within a predetermined proximity to the first captured image; assigning, by the one or more computing devices, one or more neighboring images of the first captured image from the set of neighboring captured images; and providing, by the one or more computing devices in response to a click or drag event, the one or more neighboring images.

DETAILED DESCRIPTION

Overview

Figure 1:
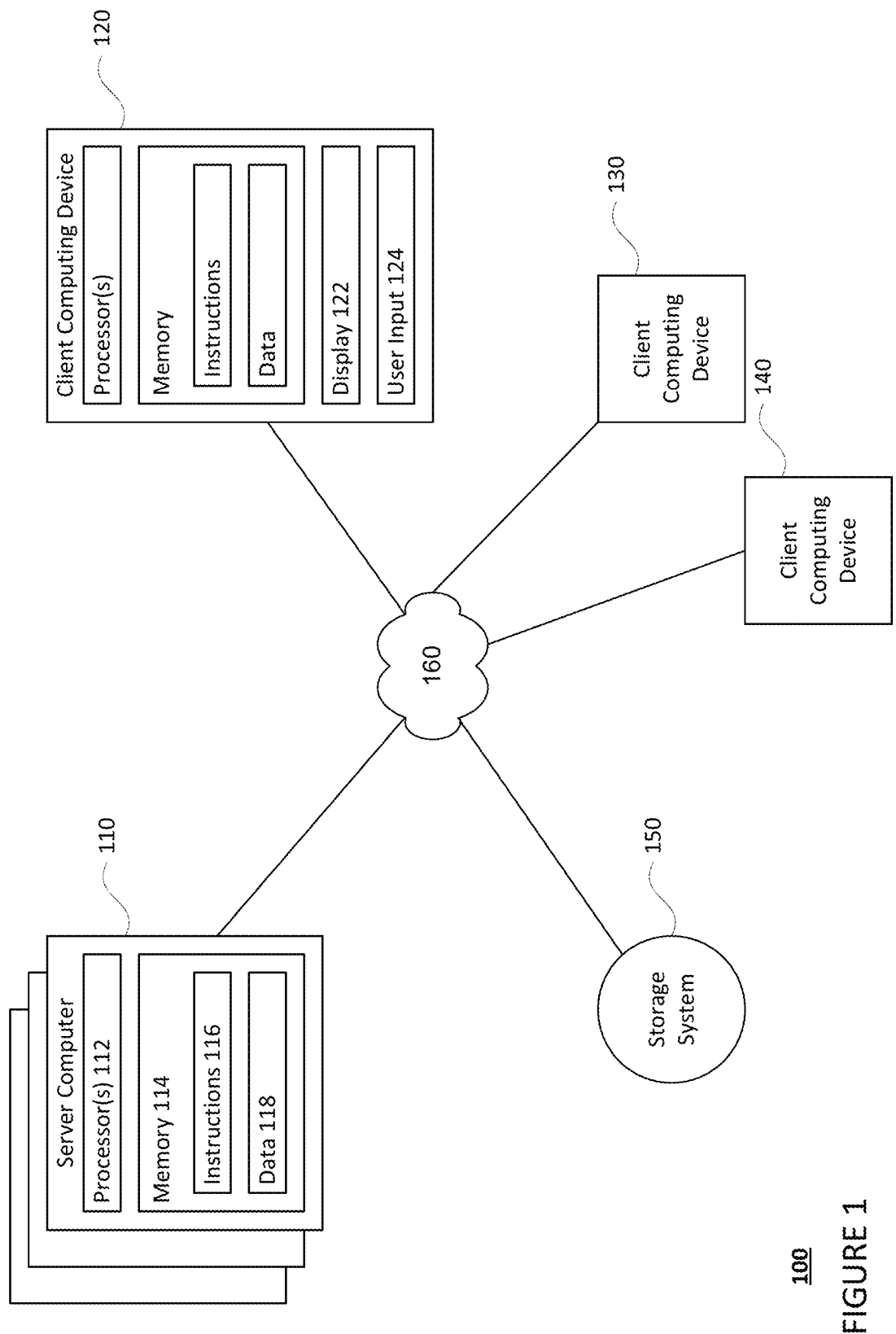
FIG. 1 is a functional diagram of an example system in accordance with aspects of the disclosure.

The technology relates to navigating imagery that is organized into clusters based on common patterns exhibited when imagery is captured. For example, images of various scenes captured by multiple users may be analyzed by one or more computing devices to organize the captured images into clusters that correspond to the same scene and, when combined, satisfy at least one common pattern. A user may then select a cluster, and in response, a captured image within the selected cluster may be displayed on one of the one or more computing devices. As the user pans through the captured images within a cluster, the display may switch to another captured image in accordance with the common pattern assigned to the images within the cluster. Additionally, the user may switch between viewing different clusters. Accordingly, the user is provided with a smooth navigation experience that may mimic the way the multiple users typically capture the scene that is being displayed.

Captured images from one or more users may also be combined into patterns. For example, the captured images of a given scene may be grouped, by one or more computing devices, into clusters based on the type of pattern the captured images satisfy when combined. In this regard, a group of captured images, from one or more users may be placed into one or more of a panoramic pattern cluster, a translation pattern cluster, and an orbit pattern cluster.

In order to determine panoramic pattern clusters, panoramic centers representing the coordinates from where a camera captured a first captured image may be determined. Updated panoramic centers may be found by iteratively averaging the coordinates of the first panoramic center with each additional captured image within the first panoramic circle. A final panoramic circle may then be calculated to include as many of the captured images that were within the first panoramic circle as possible. Additional final panoramic circles may be found by iteratively performing the above process on captured images that do not fall within a determined final panoramic circle.

To determine a translation pattern cluster a reduced candidate set of closest neighboring images within a threshold angle may be calculated for, and associated with, each captured image. The reduced candidate sets may be extended to create potential translation pattern clusters of captured images which are within an angle threshold value of the associated captured image. Translation pattern clusters may be determined by keeping potential translation pattern clusters that satisfy threshold criteria. In this regard, potential translation pattern clusters that contain less than a threshold number of captured images may be disregarded. The potential translation pattern clusters that contain at least the threshold number of captured images may be made translation pattern clusters.

In order to determine orbit pattern clusters, captured images that are directed towards one or more orbit object centers and provide a smooth translation around the orbit object centers may be found or identified. For example, the captured images may be compared to determine groups of captured images that have overlapping image data. The groups of captured images that contain overlapping image data are considered to be neighboring images. Orbit object centers are determined by considering each captured image as a ray emanating from the location at which the image was captured, and in the direction a camera center was pointed when the captured image was captured. Intersection points between rays of neighboring images may then be found. A clustering algorithm may then find orbit object centers by determining areas that have a sufficient level of intersecting points.

For each orbit object center, captured images that contain image data associated with a portion of a scene located at an orbit object center may be associated with that orbit object center. The groups of captured images that contain at least a threshold number of captured images may be analyzed to determine if the view angle covered by the captured images within each group of images contain a view angle greater than a threshold angle value. All groups of images that satisfy these thresholds may be considered an orbit pattern cluster.

One or more captured images within the determined clusters may be viewed on the display of a computing device. In this regard, a user may navigate between different clusters or within a single cluster. For example, click targets that represent clusters not currently being viewed may be provided on the display to enable the user to switch between clusters. Additionally, drag targets, which represent neighboring images within a currently viewed cluster may be provided to the user to enable the user to navigate within the currently viewed cluster.

Click targets may be determined based on a currently selected cluster. For example, a user may select an initial cluster to view. A captured image within the initial cluster may be displayed on a computing device. One or more neighboring captured images to the currently displayed captured image, outside of the initial cluster, may be assigned as the one or more click targets.

In order to provide navigation within a panoramic pattern cluster using a drag target, a drag target cost may be computed for each captured image closest to a currently displayed captured image, within the current cluster. For each drag vector direction, the image with the lowest drag target cost may be made a drag target along that drag vector direction. Accordingly, when the user pans the display along a drag vector direction, the drag target with the lowest drag target cost may be displayed on the computing device.

For navigating within orbit and translation pattern clusters, neighboring captured images to the right and left of a currently displayed captured image may be found or identified. The view angles of the neighboring images may be compared with the view angle of the currently displayed image to determine if the images are located to the left or right of the currently displayed image. The neighboring images which are closest a target drag distance, either to the left or right, may then be made the left and right drag targets, respectively. Accordingly, when the user pans the display to the left or right, the left or right drag target, respectively, may be displayed on the computing device.

The features described herein may allow for a smooth navigation experience that mimics the way users typically would view the scene as if they were there. By doing so, the user may experience a predictable navigation experience which provides a natural view of a scene. In addition, the navigation experience will be consistent when navigating both large and small groups of captured images of a scene.

Example Systems

Figure 2:
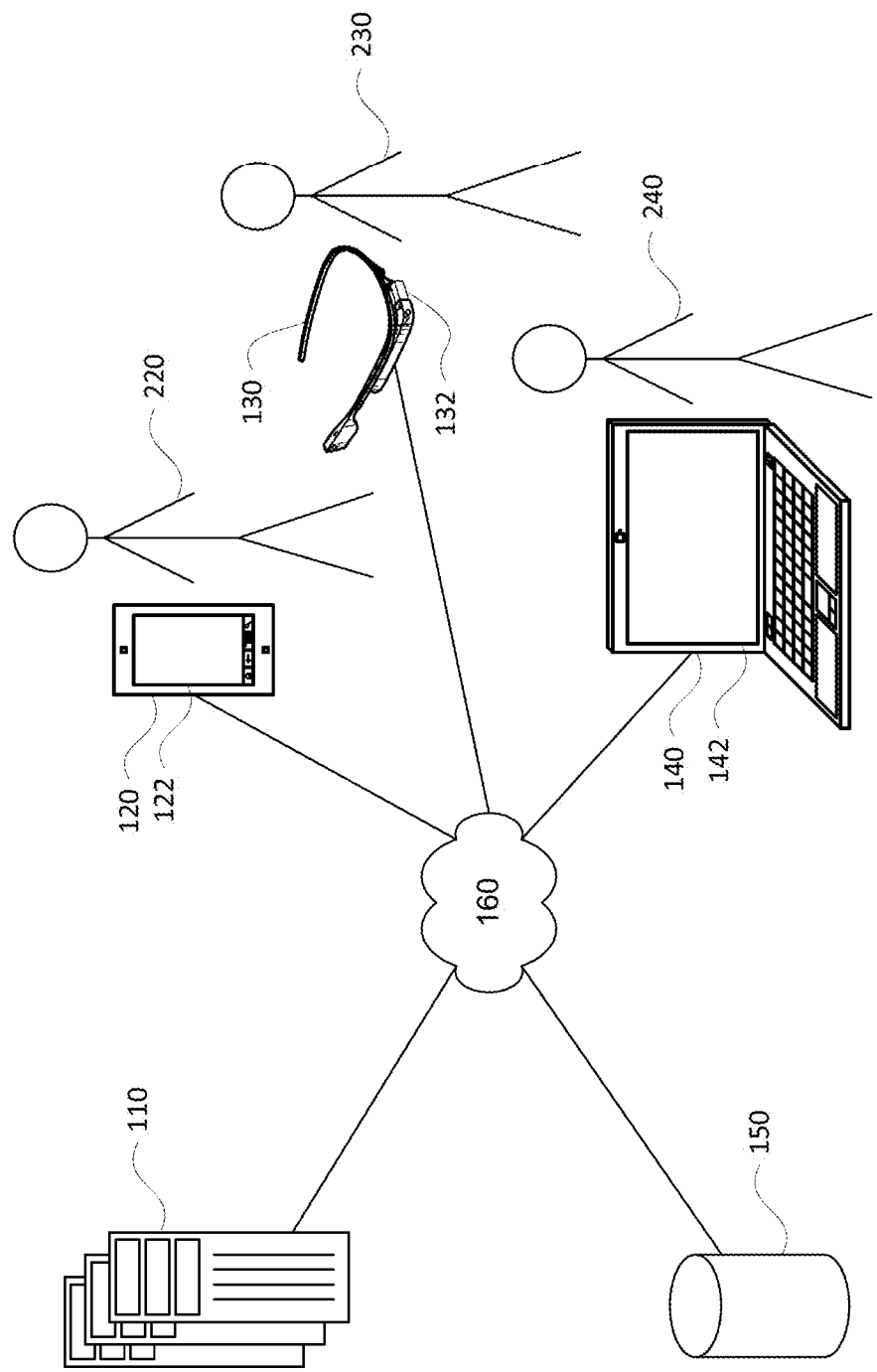
FIG. 2 is a pictorial diagram of the example system of FIG. 1.

FIGS. 1 and 2 include an example system 100 in which the features described above may be implemented. It should not be considered as limiting the scope of the disclosure or usefulness of the features described herein. In this example, system 100 may include computing devices 110, 120, 130, and 140 as well as storage system 150. Each computing device 110 may contain one or more processors 112, memory 114 and other components typically present in general purpose computing devices. Memory 114 of each of computing devices 110, 120, 130, and 140 may store information accessible by the one or more processors 112, including instructions 116 that may be executed by the one or more processors 112.

Memory may also include data 118 that may be retrieved, manipulated or stored by the processor. The memory may be of any non-transitory type capable of storing information accessible by the processor, such as a hard-drive, memory card, ROM, RAM, DVD, CD-ROM, write-capable, and read-only memories.

The instructions 116 may be any set of instructions to be executed directly, such as machine code, or indirectly, such as scripts, by the one or more processors. In that regard, the terms "instructions," "application," "steps" and "programs"

may be used interchangeably herein. The instructions may be stored in object code format for direct processing by a processor, or in any other computing device language including scripts or collections of independent source code modules that are interpreted on demand or compiled in advance. Functions, methods and routines of the instructions are explained in more detail below.

Data 118 may be retrieved, stored or modified by the one or more processors 112 in accordance with the instructions 116. For instance, although the subject matter described herein is not limited by any particular data structure, the data may be stored in computer registers, in a relational database as a table having many different fields and records, or XML documents. The data may also be formatted in any computing device-readable format such as, but not limited to, binary values, ASCII or Unicode. Moreover, the data may comprise any information sufficient to identify the relevant information, such as numbers, descriptive text, proprietary codes, pointers, references to data stored in other memories such as at other network locations, or information that is used by a function to calculate the relevant data.

The one or more processors 112 may be any conventional processors, such as a commercially available CPU. Alternatively, the processors may be dedicated components such as an application specific integrated circuit ("ASIC") or other hardware-based processor. Although not necessary, one or more of computing devices 110 may include specialized hardware components to perform specific computing processes, such as decoding video, matching video frames with images, distorting videos, encoding distorted videos, faster or more efficiently.

Although FIG. 1 functionally illustrates the processor 112, memory 114, and other elements of computing device 110 as being within the same block, the processor, computer, computing device, or memory may actually comprise multiple processors, computers, computing devices, or memories that may or may not be stored within the same physical housing. For example, the memory may be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein may be implemented by a plurality of computing devices, for example, communicating information over network 160.

Each of the computing devices 110 may be at different nodes of a network 160 and capable of directly and indirectly communicating with other nodes of network 160. Although only a few computing devices are depicted in FIGS. 1-2, it should be appreciated that a typical system may include a large number of connected computing devices, with each different computing device being at a different node of the network 160. The network 160 and intervening nodes described herein may be interconnected using various protocols and systems, such that the network may be part of the Internet, World Wide Web, specific intranets, wide area networks, or local networks. The network may utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 110 may include web servers capable of communicating with storage system 150 as well as computing devices 120, 130, and 140 via the network. For example, one or more of server computing devices 110 may use network 160 to transmit and present information to a user, such as user 220, 230, or 240, on a display, such as displays 122, 132, or 142 of computing devices 120, 130, or 140. In this regard, computing devices 120, 130, and 140 may be considered client computing devices and may perform all or some of the features described herein.

Each of the client computing devices 120, 130, and 140 may be configured similarly to the server computing devices 110, with one or more processors, memory and instructions as described above. Each client computing device 120, 130 or 140 may be a personal computing device intended for use by a user 220, 230, 240, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touch-screen or microphone). The client computing device may also include a camera for recording video streams and/or capturing images, speakers, a network interface device, and all of the components used for connecting these elements to one another.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. The user may interact with the client computing device, for example, by inputting information using a small keyboard, a keypad, microphone, using visual signals with a camera, or a touch screen.

As with memory 114, storage system 150 may be of any type of computerized storage capable of storing information accessible by the server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIGURE and/or may be directly connected to any of the computing devices 110, 120, 130, and 140 (not shown).

Example Methods

Operations in accordance with a variety of aspects of the disclosure will now be described. It should be understood that the following operations do not have to be performed in the precise order described below. Rather, various steps can be handled in reverse order or simultaneously or not at all.

Figure 3:
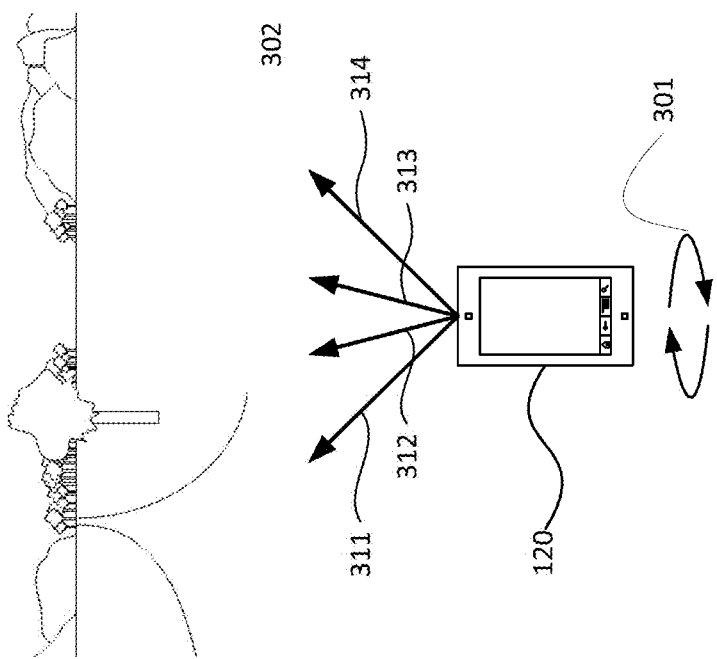
FIG. 3 is an example of a computing device capturing images in a panoramic pattern in accordance with aspects of the disclosure.

Images of various scenes captured by multiple users may be analyzed by one or more computing devices to organize the captured images into clusters that correspond to the same scene and, when combined, satisfy at least one common pattern. Images may be captured by users in accordance with one of three common patterns. Users may capture images of a scene with cameras by performing a panoramic pattern, a translation pattern, or an orbit pattern. For example, a user may stand in a single spot and capture multiple images of a scene while turning a camera, therefore performing a panoramic pattern. A user, such as user 220 using client computing device 120 may move the computing device in an arcing motion when capturing images of a scene. FIG. 3 illustrates an example of a user capturing a scene 302 by panning a client computing device 120 equipped with a camera. In this regard, the computing device 120 may be rotated around axis 301 to rotate the field of view of the client computing device 120 equipped with a camera relative towards the scene 302. As the computing device 120 rotates through the different fields of view 311 through 314, different portions of the scene 302 may be captured.

Figure 4:
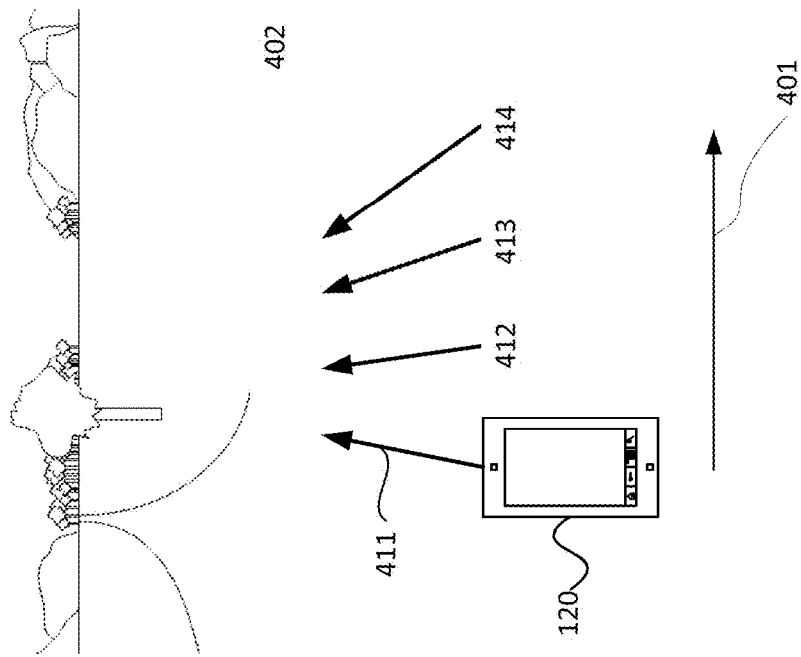
FIG. 4 is an example of a computing device capturing images in a translation pattern in accordance with aspects of the disclosure.

Users may also capture multiple images of a scene while moving in a linear direction, therefore performing a translation pattern. FIG. 4 illustrates an example of a how a user, such as user 220, may move the computing device 120 in a linear motion along axis 401 when capturing a scene 402. In this regard, the computing device 120 may be moved along axis 401 to switch the field of view of the client computing device 120 equipped with a camera relative towards the scene 402. As the computing device 120 moves along the axis 401, the different fields of view 411 through 414 may be captured.

Figure 5:
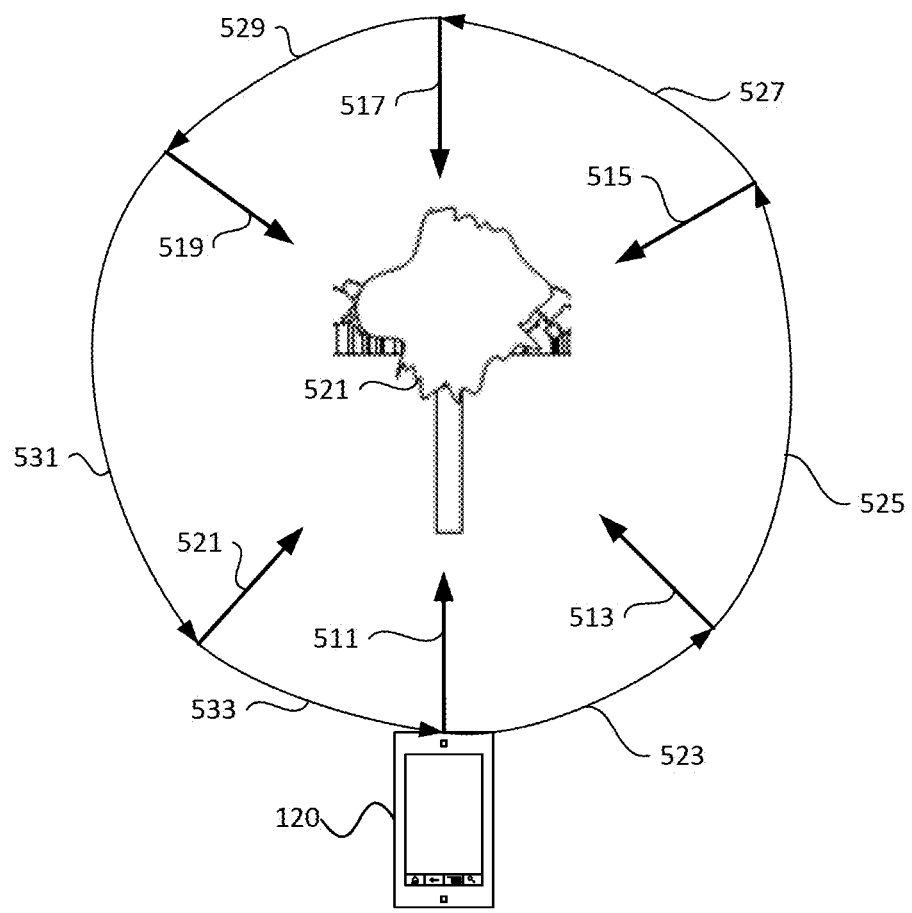
FIG. 5 is an example of a computing device capturing images in an orbit pattern in accordance with aspects of the disclosure.

Additionally, the user may capture multiple images of a scene while moving in a circular direction around the scene, therefore performing an orbit pattern. FIG. 5 illustrates an example of a how a user, such as user 220, may move the computing device 120 in a circular direction around the scene 521. In this regard, the user 220 may move the computing device 120 along a path from 523 through 533 around the scene 521. As the computing device 120 moves along the path, the different fields of view 511 through 521 may be captured.

Captured images from one or more users may also be combined into patterns. For example, the captured images of a given scene may be grouped, by one or more computing devices, into clusters based on the type of pattern the captured images satisfy when combined. In this regard, a group of captured images, from one or more users may be placed into a panoramic pattern cluster, a translation pattern cluster, and/or an orbit pattern cluster. In grouping the captured images the height dimension (altitude) may be omitted because groups of photos are likely to be taken within a small range of height. Accordingly, the grouping of captured images may be based on a two-dimensional plane representing a lateral and longitudinal plane.

Figure 6A:
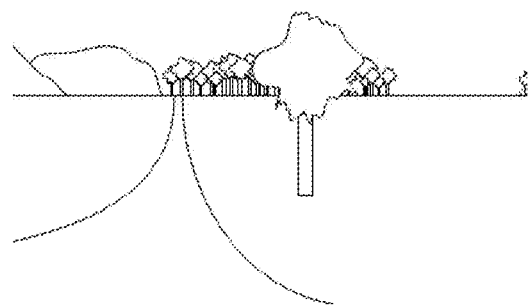
FIG. 6A is an example of a set of panoramic pattern clusters in accordance with aspects of the disclosure.
Figure 6A:
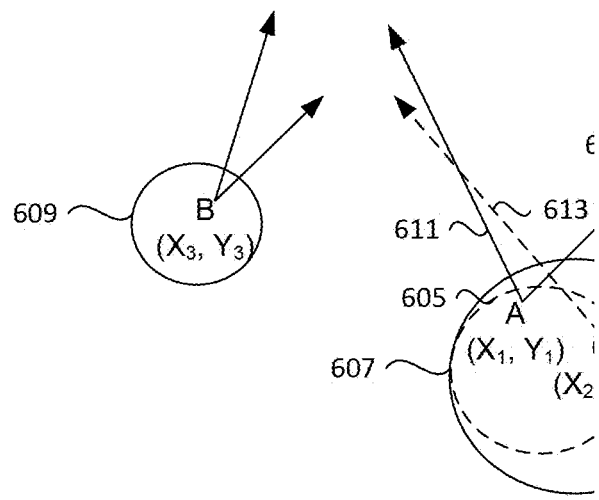

In order to determine panoramic pattern clusters, a first panoramic center representing the coordinates from where a camera captured a first captured image is determined. In this regard, a first panoramic circle may be found around the first panoramic center by calculating a circular distance around the first panoramic center with a set radius such as about 3 meters, or more or less, as shown in FIG. 6A. In the example, first panoramic center A may be found at $(X_1, Y_1)$, where first captured image 611 was captured. Updated panoramic centers may be found by iteratively averaging the coordinates of the first panoramic center A with each additional captured image, 613 and 615, within the first panoramic circle 605. First panoramic circle 605 includes captured images from capture points A at $(X_1, Y_1)$ and C at $(X_2, Y_2)$. Iterations may be performed until the updated panoramic center coordinates converge, or until a set threshold of iterations has been performed, such as 30 or more or less iterations.

A final panoramic circle may then be found around the updated panoramic center coordinates so to include as many of the captured images that were within the first panoramic circle as possible. In the example shown in FIG. 6A, final panoramic circle 607 may be determined to include images 611 and 615 captured at capture point A and image 613 captured at capture point C. Additional final panoramic circle 609 may be found by iteratively performing the above process on captured images that do not fall within a determined final panoramic circle, such as those captured at point B at $(X_3, Y_3)$. This process may be performed until all captured images are within final panoramic circles. In some cases, a final panoramic circle may include only a single captured image.

Figure 6B:
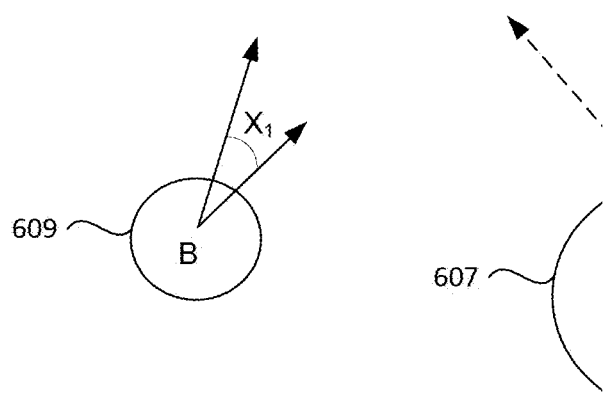
FIG. 6B is an example of view angle thresholds in accordance with aspects of the disclosure.

Panoramic pattern clusters may be determined by keeping final panoramic circles that satisfy certain threshold criteria. In this regard, final panoramic circles that contain less than a threshold number of captured images, such as 8, or more or less, may be disregarded. In addition, any final panoramic circles that contain at least the threshold number of captured images may be analyzed to determine if the view angle, the total angle of the field of view, covered by the captured images within each final panoramic circle contain a view angle greater than a threshold angle value, as shown in FIG. 6B. In the example of FIG. 6B, the view angles between images, $X_2$ and $X_1$, captured within the two final panoramic circles 607 and 609, respectively, may be determined to see if they satisfy the threshold angle value. All final panoramic circles that satisfy at least one or both of the above criteria may be considered a panoramic pattern cluster.

Figure 7B:
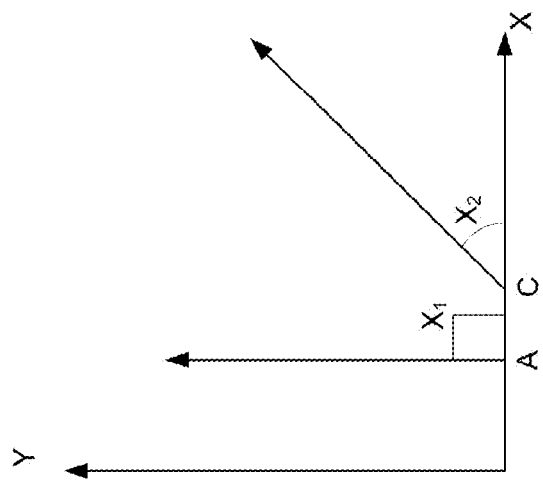
FIG. 7B is an example of angle thresholds in accordance with aspects of the disclosure.
Figure 7A:
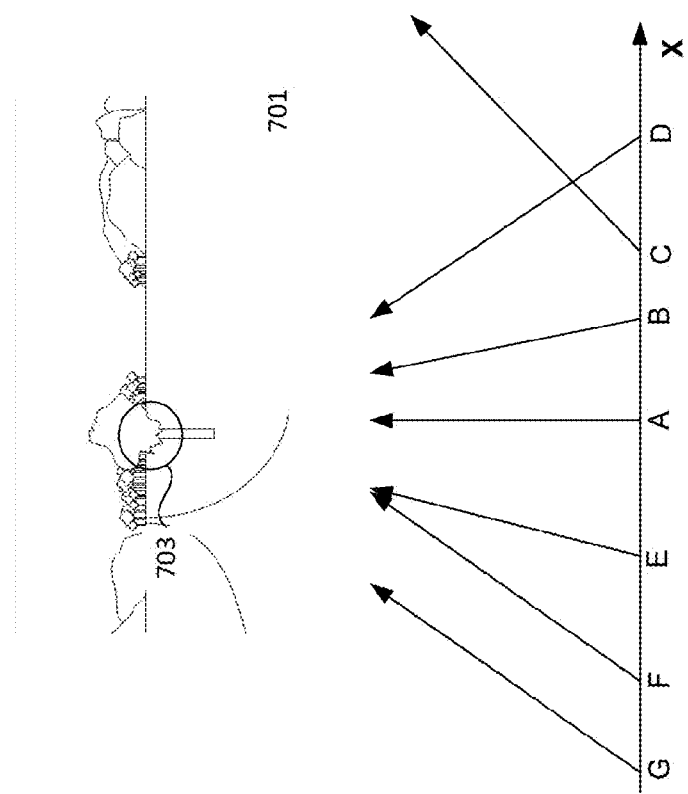
FIG. 7A is an example of an initial candidate set of captured translation images in accordance with aspects of the disclosure.

To determine a translation pattern cluster, captured images that are within a set angle threshold of each other may be determined. For example, for a first captured image, an initial candidate set of the closest neighboring captured images, to the left and right of the first captured image along a horizontal axis relative to the scene, may be determined, as shown in FIG. 7A. In the example of FIG. 7A, the first captured image A, and the captured images within the initial candidate set, here images B through E, the direction a camera center was pointed when the images were captured may be determined. As shown in FIG. 7B, each captured image within the initial candidate set whose direction is at an angle greater than a threshold angle of, for example, about 36 or more or less degrees from the first captured image may be discarded, such that remaining images are those captured from generally the same angle. In this regard, first captured image A may be at a 90 degree angle, $X_1$, while image C may be at an angle of 45 degrees, $X_2$. Accordingly, image C may be discarded from the initial candidate set, as the difference is greater than the set angle threshold. The initial candidate set may then be reduced to a reduced candidate set including a predetermined number, such as six or more or less of captured images of the initial candidate set which are closest to the first captured image. Reduced candidate sets may thus be calculated for, and associated with, each captured image.

The reduced candidate sets may be extended to create potential translation pattern clusters. For example, starting with a first captured image, each captured image within the reduced candidate set associated with the first captured image may be analyzed. The captured images which are within the set angle threshold value and located to the left of the first captured image along the horizontal axis relative to the scene may be combined into a potential translation pattern cluster. If all captured images within the reduced candidate set associated with the first captured image satisfy or are within the set angle threshold value, the captured images within a neighbor candidate set associated with a captured image immediately left of the first captured image may also be analyzed. Each captured image of the neighbor candidate set that satisfies the angle threshold value may be placed into the potential translation cluster. For example, the neighbor candidate sets associated with captured images immediately left of the currently analyzed captured image may be iteratively analyzed, starting with images closest to the currently analyzed images, to determine whether captured images satisfy the angle threshold value or are within the angle threshold value of the currently analyzed image. This may continue until one of the captured images within the neighbor candidate sets does not satisfy or is not within the angle threshold value of the currently analyzed image. All analyzed captured images which satisfy the angle threshold value of the currently analyzed image may then be included in the potential translation pattern cluster. The same process may then be performed to find images to the right of the first captured image.

Translation pattern clusters may be determined by keeping potential translation pattern clusters that satisfy additional threshold criteria. In this regard, potential translation pattern clusters that contain less than a threshold number of captured images, such as 8, or more or less, may be disregarded. The potential translation pattern clusters that contain at least the threshold number of captured images may be considered translation pattern clusters.

In order to determine orbit pattern clusters, captured images that are directed towards one or more orbit object centers and provide a smooth translation around the orbit object centers are found. For example, the captured images may be compared to determine groups of captured images that have overlapping image data. Overlapping image data may be found using computer vision algorithms, such as feature detection algorithms and structure from motion (SfM) algorithms. In this regard, feature points for each of the captured images may be determined. The feature points of each captured image may then be compared using SfM algorithms to determine if any of the points are common, meaning they contain overlapping image data. The groups of captured images that contain overlapping image data are considered to be neighboring images.

Figure 8:
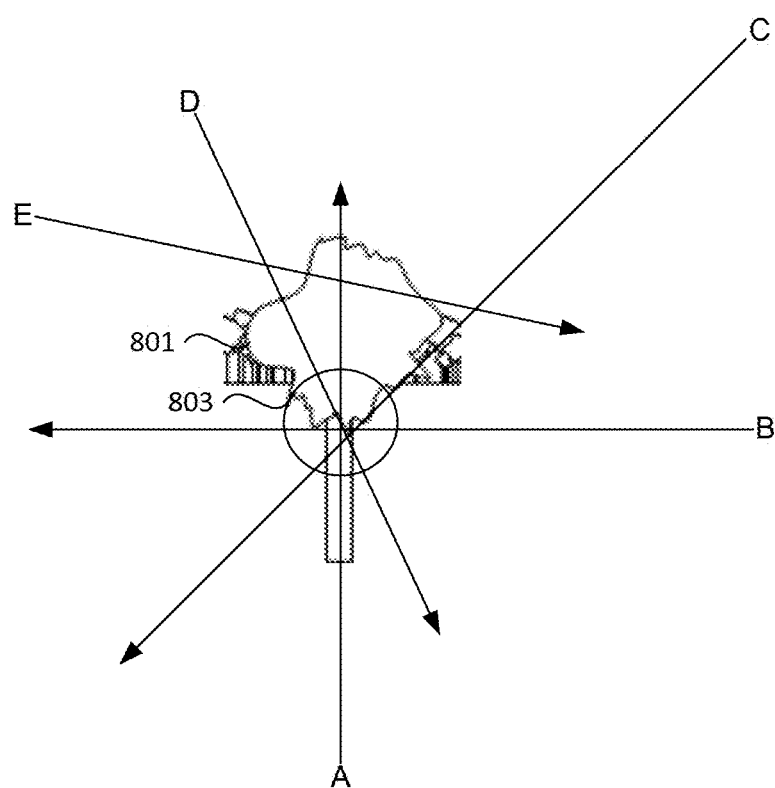
FIG. 8 is an example of an orbit pattern cluster in accordance with aspects of the disclosure.

Orbit object centers may be determined by considering each captured image as a ray emanating from the location at which the image was captured, and in the direction a camera center was pointed when the captured image was captured as shown in FIG. 8. In this example, intersection points between rays of neighboring images A through E, may then be found. A clustering algorithm may then be used to find orbit object centers by determining areas that have a sufficient level of intersecting points, 803. In one example, a K-means clustering algorithm that determines center points for areas densely populated with intersecting rays may be used to determine orbit object center coordinates.

Orbit pattern clusters may be determined by associating captured images with orbit object centers. For example, as shown in FIG. 8, for each orbit object center, captured images that contain image data associated with a portion of a scene 801 located at an orbit object center 803 may be associated with that orbit object center. Captured images A, B, C, and D associated with a respective orbit object center 803 may then be grouped together. In one example, captured images associated with a respective orbit object center may be grouped together by using a disjoint-set data structure to merge captured images that have a smooth transformation. A smooth transformation may be determined by finding the distance between a first and second of the two captured images to the associated orbit object center. If the difference in distance between the two captured images is no greater than about a half to about three-quarters of the distance to orbit center for the captured image that is closer to the orbit center, the two captured images may be considered as having a smooth transformation. In this regard, multiple groups of captured images may be associated with an orbit object centers.

Orbit pattern clusters may be determined by keeping groups of captured images that satisfy certain threshold criteria. In this regard, groups of captured images that contain less than a threshold number of captured images, such as 8, or more or less, may be disregarded. The groups of captured images that contain at least the threshold number of captured images may be analyzed to determine if the view angle covered by the captured images within each group of images contain a view angle greater than a threshold value. All groups of images that satisfy at least one or both of the above threshold criteria may be considered an orbit pattern cluster.

One or more captured images within the determined clusters may be viewed on the display of a computing device. In this regard, a user may navigate between different clusters or within a single cluster. For example, click targets, which represent clusters not currently being viewed, may be provided on the display to enable the user to switch between clusters. Click targets may be activated by clicking on the target using a mouse point or tapping on a touch sensitive screen. Additionally, drag targets, which represent neighboring images within a currently viewed cluster may be provided to the user to enable the user to navigate within the currently viewed cluster. Drag targets may be activated by dragging on the target using a mouse point or tapping on a touch sensitive screen.

Figure 11:
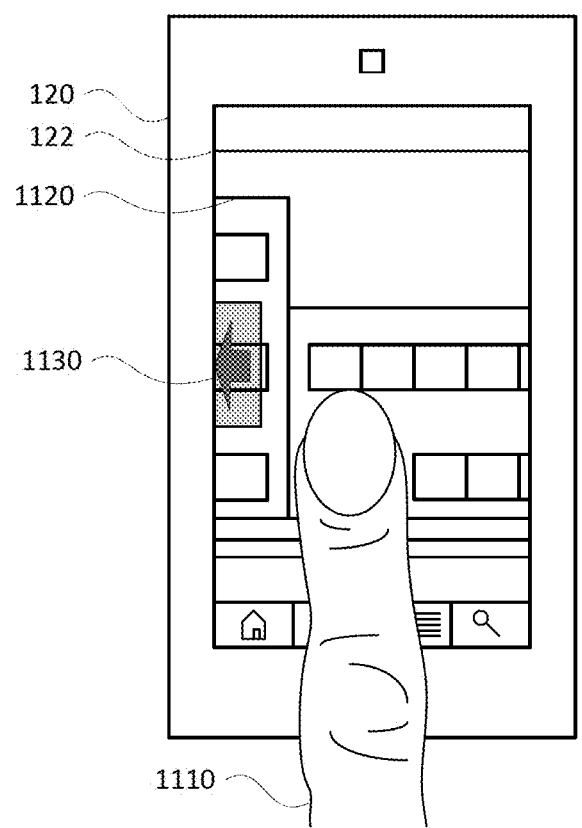
FIG. 11 is an example of a computing device navigating between clusters in accordance with aspects of the disclosure.

Click targets may be determined based on a currently selected cluster. For example, a user may select an initial cluster to view. A captured image within the initial cluster may be displayed on a computing device. One or more neighboring captured images to the currently displayed captured image, outside of the initial cluster, may be assigned as the one or more click targets, as shown in FIG. 11. In this regard, one or more neighboring captured images may be assigned as a click target 1130, if the neighboring image was captured from a location closer to the scene than the currently displayed captured image 1120. If the one or more neighboring captured images were captured from a location closer to the scene, a captured image within the one or more neighboring captured images that is closest to the currently displayed captured image 1120 may be made the click target 1130. Accordingly, when a user 1110 selects a click target 1130, the display 122 of the computing device 120 switches from the currently displayed captured image 1120 to the assigned nearest captured image associated with that click target. New click targets may be determined each time the user switches between clusters and/or displayed captured images.

In order to provide navigation within a panoramic pattern cluster using a drag target, a drag target cost may be computed for each captured image closest to a currently displayed captured image, within the current cluster. In this regard, the drag target cost may include various cost terms. These cost terms may be related to the flow fields, of the translational and rotational "flow" of pixels between the currently displayed captured image and the captured images closest to the currently displayed captured image. Other cost terms which are not based on flow, such as an overlap cost, may also be used. In one example, the target image should overlap with the reference image as much as possible. Thus, the overlap cost may include two cost values: (1) how much of the reference image overlaps with the target image and (2) how much of the target image overlaps with the reference image. As overlap increases, the overlap cost may decrease. Thus, this cost value may be an inverted value. For each captured image, the costs may be compounded to create a drag target cost for each captured image.

Figure 9:
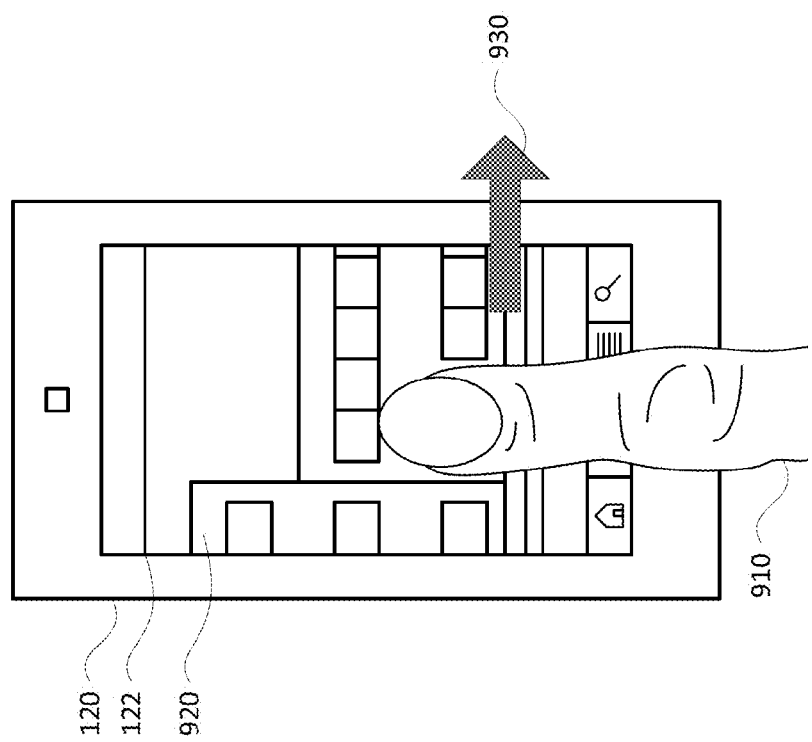
FIG. 9 is an example of a computing device navigating within a cluster in accordance with aspects of the disclosure.

In one example, for each drag vector direction, the image with the lowest drag target cost may be made a drag target along that drag vector direction, as shown in FIG. 9. Accordingly, when the user 910 pans the display 122 of the computing device 120 along a drag vector direction 930, the currently displayed captured image 920 may switch to the drag target with the lowest drag target cost.

Figure 10:
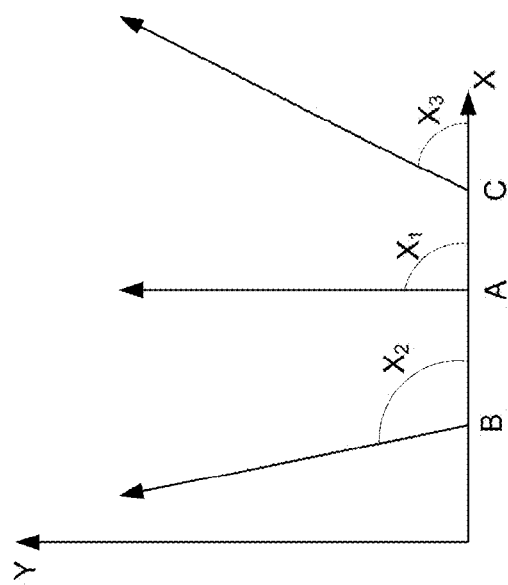
FIG. 10 is an example of view angles in accordance with aspects of the disclosure.

For navigating within orbit and translation pattern clusters, neighboring captured images to the right and left of a currently displayed captured image are found. For example, a center point for a currently displayed cluster may be determined. Returning to FIG. 10, the view angle $X_1$ of a currently displayed captured image A and one or more neighboring captured images B and C may be found by calculating the view angle from each image to the center point. Images that have a view angle which largely deviates from the view angle $X_1$ of the currently displayed image A by, for example, about 30 degrees, may be discarded. The view angles $X_2$ and $X_3$ of the neighboring images B and C may be compared with the view angle $X_1$ of the currently displayed image A to determine if the images are located to the left or right of the currently displayed image.

Neighboring images within the orbit and translation pattern clusters may be made either a left or right drag target relative to the currently displayed image. In this regard, the neighboring images which are closest to a target drag distance may be made the left or right drag targets. A target drag distance may be between about 0 and 30 degrees, or more or less. The neighboring images that are closest to the target drag distance, calculated as the view angle difference between each respective neighboring image and the currently displayed image, either to the left or right, may then be made the left and right drag targets, respectively. Accordingly, when the user pans the display to the left or right, the left or right drag target, respectively, may be displayed on the computing device.

Figure 12:
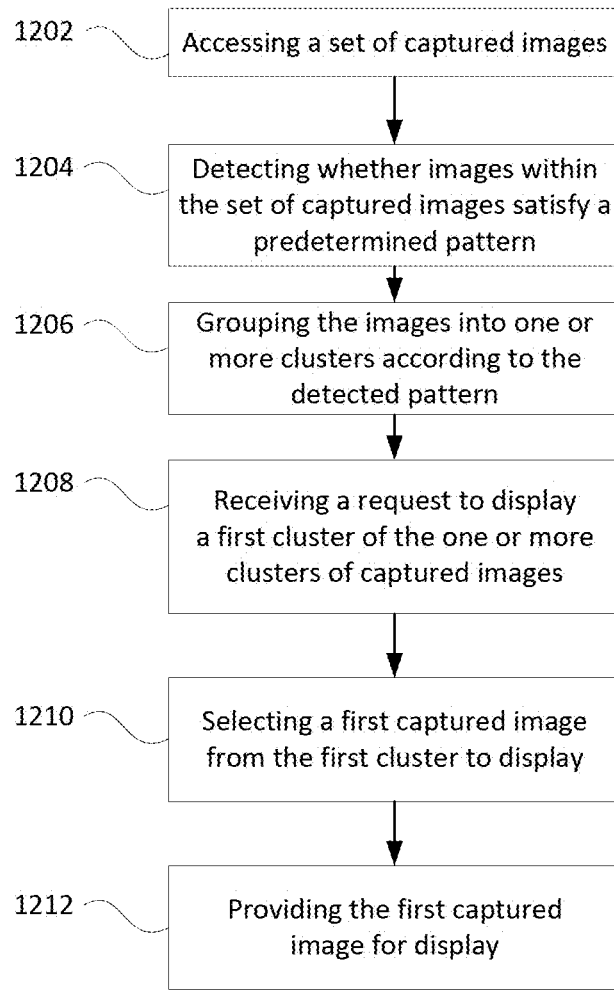
FIG. 12 is a flow diagram in accordance with aspects of the disclosure.

Flow diagram 1200 of FIG. 12 is an example flow diagram of some of the aspects described above that may be performed by one or more computing devices such as client computing devices 120, 130, or 140. It will be understood that the steps discussed herein are merely an example; the steps may occur in a different order, steps may be added, and steps may be omitted. In this example, at block 1202 a set of captured images may be accessed. The one or more computing devices may then detect whether images within the set of captured images satisfy a predetermined pattern, as shown in block 1204. Based on the patterns detected, the images may be grouped into one or more clusters, as shown in block 1206. A request to display a first cluster of the one or more clusters being received, as shown in block 1208. A first captured image, as shown in block 1210, may be selected for display. The selected first captured image may then be provided for display, as shown in block 1212.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method for organizing and navigating image clusters comprising:
  accessing, by one or more processing devices, a set of captured images;
  detecting, by the one or more processing devices, whether images within the set of captured images satisfy a predetermined pattern;
  grouping, by the one or more processing devices, the images in the set of captured images into one or more clusters according to the detected predetermined pattern;
  determining, by the one or more processing devices, from the images within a first cluster, a set of neighboring captured images that are within a predetermined proximity to the first captured image;
  assigning, by the one or more processing devices, one or more neighboring images of the first captured image from the set of neighboring captured images;
  receiving, by the one or more processing devices, a request to display the first cluster of the one or more clusters of captured images;
  selecting, by the one or more processing devices in response to the request, a first captured image from the first cluster to display;
  providing the first captured image from the first cluster for display; and
  providing, by the one or more processing devices in response to a click or drag event, the one or more neighboring images.

2. The method of claim 1, wherein the predetermined pattern is one of a panoramic pattern, an orbit pattern, and a translation pattern.

3. A method for organizing and navigating image clusters comprising:
  accessing, by one or more processing devices, a set of captured images;
  detecting, by the one or more processing devices, whether images within the set of captured images satisfy a predetermined pattern; and
  grouping, by the one or more processing devices, the images in the set of captured images into one or more clusters according to the detected predetermined pattern, wherein the predetermined pattern is a panoramic pattern, and wherein detecting whether the images within the set of captured images satisfies the predetermined pattern comprises:
  identifying, by the one or more processing devices, each possible panoramic circle in the set of captured images, wherein each possible panoramic center is associated with a subset of the set of captured images and has a view angle for the subset of captured images; and
  removing any of the possible panoramic circles in which (i) a number of the subset of captured images is fewer than a predetermined number, and (ii) the view angle is less than a predetermined angle; and
  providing, by the one or more processing devices, a first image from the one or more clusters which satisfies the predetermined pattern for display.

4. The method of claim 3, wherein identifying each possible panoramic circle includes:

setting an initial panoramic circle around a coordinate for one of the captured images;

revising the initial panoramic circle center coordinate by averaging coordinates from captured images within the initial panoramic circle;

repeating the revising until a threshold number of revisions has occurred or the panoramic circle center coordinate converges to a single point; and setting a final panoramic circle around the revised panoramic circle center coordinate.

5. A method for organizing and navigating image clusters comprising:

accessing, by one or more processing devices, a set of captured images; detecting, by the one or more processing devices, whether images within the set of captured images satisfy a predetermined pattern;

grouping, by the one or more processing devices, the images in the set of captured images into one or more clusters according to the detected predetermined pattern, wherein the predetermined pattern is an orbit pattern, and wherein detecting whether the images within the set of captured images satisfies the predetermined pattern comprises:

identifying, by the one or more processing devices, for each image in the set of captured images, a ray emanating from the location the image was captured, and in the direction a camera center was pointed when the captured image was taken;

calculating, by the one or more processing devices, intersection points between each ray; and determining, by the one or more processing devices orbit centers based on densities of the intersection points; and providing, by the one or more processing devices, a first image from the one or more clusters which satisfies the predetermined pattern for display.

6. The method of claim 5, wherein the method further comprises: for each identified orbit center:

filtering out images that do not include the orbit center; and dividing the remaining images into groups in which the remaining images have smooth translation around the orbit center; and removing groups which do not include at least a predetermined number of images and do not satisfy a threshold angle of coverage.

7. A method for organizing and navigating image clusters comprising:

accessing, by one or more processing devices, a set of captured images;

detecting, by the one or more processing devices, whether images within the set of captured images satisfy a predetermined pattern;

grouping, by the one or more processing devices, the images in the set of captured images into one or more clusters according to the detected predetermined pattern, wherein the predetermined pattern is a translation pattern, and wherein detecting whether images within the set of captured images satisfies the predetermined pattern comprises:

identifying, by the one or more processing devices, for each image in the set of captured images, an adjacent initial set of candidate images; and reserving, by the one or more processing devices, for each image, the candidate images in the initial set of candidate images which are located closest to the image, and are within an angle threshold of a viewing angle of the image; and providing, by the one or more processing devices, a first image from the one or more clusters which satisfies the predetermined pattern for display.

8. The method of claim 1, wherein assigning the one or more neighboring images of the first captured image from the set of neighboring captured images for a panoramic pattern includes determining the one or more neighboring images which have the lowest drag target cost, wherein the drag target cost is calculated by:

determining a drag vector direction;

reserving a group of the one or more neighboring images which are in the direction of the drag vector direction;

identifying, by the one or more processing device, an amount of overlap between the first captured image and each of the one or more neighboring images in the group of one or more neighboring images; and selecting the neighboring images with the highest amount of overlap.

9. The method of claim 1, wherein assigning the one or more neighboring images of the first captured image from the set of neighboring captured images for an orbit and translation pattern includes determining the one or more neighboring images having a target distance closest to a predetermined target distance, and wherein the target distance for each captured image in the set of neighboring images is determined by:

identifying, by the one or more processing devices, a ray emanating from a location from which the image was captured and in a direction the camera was pointed;

determining, by the one or more processing devices, an angle difference between the first captured angle and each captured image in the set of neighboring images;

grouping, by the one or more processing devices, each captured image in the set of neighboring images to the left and right of first captured image based on the angle difference; and determining, by the one or more processing devices, a target distance.

10. A system for organizing and navigating image clusters comprising:

one or more computing devices; and memory storing instructions, the instructions executable by the one or more computing devices;

wherein the instructions comprise:

accessing, by one or more computing devices, a set of captured images;

detecting, by the one or more computing devices, whether images within the set of captured images satisfy a predetermined pattern;

grouping, by the one or more computing devices, the images in the set of captured images into one or more clusters according to the detected predetermined pattern;

determining, by the one or more processing devices, from the images within a first cluster, a set of neighboring captured images that are within a predetermined proximity to the first captured image;

assigning, by the one or more processing devices, one or more neighboring images of the first captured image from the set of neighboring captured images;

receiving, by the one or more computing devices, a request to display the first cluster of the one or more clusters of captured images;

selecting, by the one or more computing devices in response to the request, a first captured image from the first cluster to display;

providing the first captured image from the first cluster for display; and providing, by the one or more processing devices in response to a click or drag event, the one or more neighboring images.

11. The system of claim 10, wherein the predetermined pattern is one of a panoramic pattern, an orbit pattern, and a translation pattern.

12. A system for organizing and navigating image clusters comprising:

one or more computing devices; and memory storing instructions, the instructions executable by the one or more computing devices;

wherein the instructions comprise:

accessing, by one or more computing devices, a set of captured images;

detecting, by the one or more computing devices, whether images within the set of captured images satisfy a predetermined pattern; and grouping, by the one or more computing devices, the images in the set of captured images into one or more clusters according to the detected predetermined pattern, wherein when the predetermined pattern is a panoramic pattern, and wherein detecting whether the images within the set of captured images satisfies the predetermined pattern comprises:

identifying, by the one or more processing devices, each possible panoramic circle in the set of captured images, wherein each possible panoramic center is associated with a subset of the set of captured images and has a view angle for the subset of captured images; and removing any of the possible panoramic circles in which (i) a number of the subset of captured images is fewer than a predetermined number, and (ii) the view angle is less than a predetermined angle; and providing, by the one or more processing devices, a first image from the one or more clusters which satisfies the predetermined pattern for display.

13. The system of claim 12, wherein identifying each possible panoramic circle includes:

setting an initial panoramic circle around a coordinate for one of the captured images;

revising the initial panoramic circle center coordinate by averaging coordinates from captured images within the initial panoramic circle;

repeating the revising until a threshold number of revisions has occurred or the panoramic circle center coordinate converges to a single point; and setting a final panoramic circle around the revised panoramic circle center coordinate.

14. A system for organizing and navigating image clusters comprising:

one or more computing devices; and memory storing instructions, the instructions executable by the one or more computing devices;

wherein the instructions comprise:

accessing, by one or more computing devices, a set of captured images;

detecting, by the one or more computing devices, whether images within the set of captured images satisfy a predetermined pattern; and grouping, by the one or more computing devices, the images in the set of captured images into one or more clusters according to the detected predetermined pattern, wherein when the predetermined pattern is an orbit pattern, and wherein detecting whether the images within the set of captured images satisfies the predetermined pattern comprises:

identifying, by the one or more processing devices, for each image in the set of captured images, a ray emanating from the location the image was captured, and in the direction a camera center was pointed when the captured image was taken;

calculating, by the one or more processing devices, intersection points between each ray; and determining, by the one or more processing devices orbit centers based on densities of the intersection points; and providing, by the one or more processing devices, a first image from the one or more clusters which satisfies the predetermined pattern for display.

15. The system of claim 14, wherein the system further comprises:

for each identified orbit center:

filtering out images that do not include the orbit center; and dividing the remaining images into groups in which the remaining images have smooth translation around the orbit center; and removing groups which do not include at least a predetermined number of images and do not satisfy a threshold angle of coverage.

16. A system for organizing and navigating image clusters comprising:

one or more computing devices; and memory storing instructions, the instructions executable by the one or more computing devices;

wherein the instructions comprise:

accessing, by one or more computing devices, a set of captured images;

detecting, by the one or more computing devices, whether images within the set of captured images satisfy a predetermined pattern; and grouping, by the one or more computing devices, the images in the set of captured images into one or more clusters according to the detected predetermined pattern, wherein when the predetermined pattern is a translation pattern, and wherein detecting whether images within the set of captured images satisfies the predetermined pattern comprises:

identifying, by the one or more processing devices, for each image in the set of captured images, an adjacent initial set of candidate images; and reserving, by the one or more processing devices, for each image, the candidate images in the initial set of candidate images which are located closest to the image, and are within an angle threshold of a viewing angle of the image; and providing, by the one or more processing devices, a first image from the one or more clusters which satisfies the predetermined pattern for display.

17. A system for organizing and navigating image clusters comprising:

one or more computing devices; and memory storing instructions, the instructions executable by the one or more computing devices;

wherein the instructions comprise:

accessing, by one or more computing devices, a set of captured images;

detecting, by the one or more computing devices, whether images within the set of captured images satisfy a predetermined pattern;

grouping, by the one or more computing devices, the images in the set of captured images into one or more clusters according to the detected predetermined pattern;

determining, by the one or more processing devices, from the images within a first cluster, a set of neighboring captured images that are within a predetermined proximity to the first captured image;

assigning, by the one or more processing devices, one or more neighboring images of the first captured image from the set of neighboring captured images;

receiving, by the one or more computing devices, a request to display the first cluster of the one or more clusters of captured images;

selecting, by the one or more computing devices in response to the request, a first captured image from the first cluster to display;

providing the first captured image from the first cluster for display;

determining, by the one or more computing devices, from the images within the first cluster, a set of neighboring captured images that are within a predetermined proximity to the first captured image;

assigning, by the one or more computing devices, one or more neighboring images of the first captured image from the set of neighboring captured images; and providing, by the one or more computing devices in response to a click or drag event, the one or more neighboring images.

18. The system of claim 17, wherein the predetermined pattern is one of a panoramic pattern, an orbit pattern, and a translation pattern.

* * * * *